(12) United States Patent
Line et al.

(10) Patent No.: US 12,128,807 B2
(45) Date of Patent: Oct. 29, 2024

(54) SEAT-MOUNTED WORK SURFACE

(71) Applicant: Ford Global Technologies, LLC, Dearborn, MI (US)

(72) Inventors: Johnathan Andrew Line, Northville, MI (US); Scott Culver Anderson, Commerce Township, MI (US); Clay Mastin, Ferndale, MI (US); Justin D. Sorum, Royal Oak, MI (US); Albert Kim, Irvine, CA (US); Abbas Ghamlouche, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 17/699,952

(22) Filed: Mar. 21, 2022

(65) Prior Publication Data
US 2023/0294582 A1    Sep. 21, 2023

(51) Int. Cl.
*B60N 3/00* (2006.01)
*B60N 2/14* (2006.01)
*B60N 2/30* (2006.01)

(52) U.S. Cl.
CPC ............ *B60N 3/001* (2013.01); *B60N 2/143* (2013.01); *B60N 2/3065* (2013.01)

(58) Field of Classification Search
CPC ........ B60N 3/001; B60N 3/002; B60N 2/143; B60N 2/3065
USPC .............. 297/138, 144, 147, 141, 140, 173; 108/44
See application file for complete search history.

(56) References Cited

U.S. PATENT DOCUMENTS

| | | | | |
|---|---|---|---|---|
| 2,450,515 A | * | 10/1948 | Opces, V | A47B 83/02 297/378.12 |
| 2,696,774 A | | 12/1954 | Bayley | |
| 4,536,027 A | * | 8/1985 | Brennan | B64D 11/0638 297/378.12 |
| 5,035,464 A | * | 7/1991 | Spallholtz | A47C 7/62 403/115 |
| 5,129,702 A | * | 7/1992 | Ervin | A47B 83/02 248/429 |
| 5,564,779 A | * | 10/1996 | Tolbert | A47C 7/70 297/173 |
| 5,832,555 A | | 11/1998 | Saucier et al. | |

(Continued)

FOREIGN PATENT DOCUMENTS

| | | |
|---|---|---|
| EP | 3251894 A1 | 6/2017 |
| JP | 5081661 B2 | 11/2012 |
| JP | 2020047174 A | 3/2020 |

OTHER PUBLICATIONS

U.S. Appl. No. 17/700,018, filed Mar. 21, 2022, Docketed New Case—Ready for Examination, Seating Solutions for a Stationary Vehicle.

(Continued)

*Primary Examiner* — Jose V Chen
(74) *Attorney, Agent, or Firm* — Vichit Chea; Price Heneveld LLP (57) ABSTRACT

A seating assembly includes a seatback coupled to a support surface. A seat is movably coupled to the seatback such that the seat is pivotable relative to the seatback. The seat is movable between a stowed position and a deployed position. A work surface is movably coupled to an underside of the seat. The work surface is movable between a stowed position and a deployed position.

13 Claims, 6 Drawing Sheets

(56) References Cited

U.S. PATENT DOCUMENTS

| | | | |
|---|---|---|---|
| 6,179,545 B1 | 1/2001 | Petersen, Jr. et al. | |
| 6,375,259 B1* | 4/2002 | Ma | A47C 7/72 |
| | | | 297/154 |
| 6,412,738 B1* | 7/2002 | Bressler | A47C 7/70 |
| | | | 248/176.1 |
| 6,536,842 B2 | 3/2003 | Bowers et al. | |
| 7,509,696 B2* | 3/2009 | Soto | A47C 7/626 |
| | | | 297/423.22 |
| 8,061,675 B2 | 11/2011 | Downey | |
| 8,628,142 B2* | 1/2014 | van Hekken | A47C 7/70 |
| | | | 297/161 |
| 8,763,538 B2* | 7/2014 | Fukuhara | B60N 3/002 |
| | | | 108/77 |
| 9,004,993 B2 | 4/2015 | Fujii et al. | |
| 9,233,791 B2 | 1/2016 | Bushnell et al. | |
| 9,271,883 B2 | 3/2016 | Johnson et al. | |
| 9,670,013 B2 | 6/2017 | Parrish | |
| 10,369,865 B2 | 8/2019 | Perkins | |
| 10,688,889 B2 | 6/2020 | Feng et al. | |
| 10,857,913 B2 | 12/2020 | Dry et al. | |
| 10,919,428 B2 | 2/2021 | Wallace et al. | |
| 10,981,430 B2 | 4/2021 | Jeong | |
| 11,465,536 B2* | 10/2022 | Epaud | B60N 2/06 |
| 2010/0123338 A1* | 5/2010 | Waters | B60N 3/001 |
| | | | 297/125 |
| 2013/0252529 A1 | 9/2013 | Baldsiefen et al. | |
| 2014/0110976 A1* | 4/2014 | Tang | A47C 5/10 |
| | | | 297/173 |
| 2015/0321592 A1* | 11/2015 | De Morais | B64D 11/0638 |
| | | | 297/135 |
| 2019/0111877 A1* | 4/2019 | Line | B60N 3/001 |
| 2019/0381858 A1 | 12/2019 | Sadowski et al. | |
| 2019/0382224 A1 | 12/2019 | Vollmar et al. | |
| 2020/0376988 A1* | 12/2020 | Cha | B60N 3/002 |
| 2020/0406787 A1 | 12/2020 | Line et al. | |
| 2020/0406789 A1 | 12/2020 | Line et al. | |
| 2021/0053416 A1 | 2/2021 | Suzuki et al. | |
| 2021/0086678 A1* | 3/2021 | Enning | B60N 3/002 |
| 2021/0300210 A1* | 9/2021 | Numazawa | B60N 3/10 |
| 2022/0001992 A1* | 1/2022 | Heinen | B64D 11/0604 |
| 2022/0185484 A1* | 6/2022 | Marutzky | B64D 11/0015 |
| 2023/0052066 A1* | 2/2023 | Basu | B60N 3/002 |
| 2023/0219470 A1* | 7/2023 | Bonk | B60N 2/309 |
| | | | 296/65.09 |
| 2023/0294567 A1* | 9/2023 | Line | B60N 2/3047 |
| | | | 296/64 |
| 2023/0294582 A1* | 9/2023 | Line | B60N 2/3009 |
| | | | 108/44 |

OTHER PUBLICATIONS

U.S. Appl. No. 17/700,057, filed Mar. 21, 2022, Application Undergoing Preexam Processing, Seating Solutions for a Stationary Vehicle.

U.S. Appl. No. 17/700,081, filed Mar. 21, 2022, Docketed New Case—Ready for Examination, Seating Solutions for a Stationary Vehicle.

U.S. Appl. No. 17/699,981, filed Mar. 21, 2022, Docketed New Case—Ready for Examination, Seating Solutions for a Vehicle.

U.S. Appl. No. 17/699,755, filed Mar. 21, 2022, Docketed New Case—Ready for Examination, Vehicle Seating System for a Stationary Vehicle.

U.S. Appl. No. 17/699,781, filed Mar. 21, 2022, Docketed New Case—Ready for Examination, Vehicle Seating System for a Stationary Vehicle.

U.S. Appl. No. 17/699,996, filed Mar. 21, 2022, Docketed New Case—Ready for Examination, Seating Assembly with Swivel Capability.

U.S. Appl. No. 17/700,007, filed Mar. 21, 2022, Docketed New Case—Ready for Examination, Vehicle Floor Panel.

\* cited by examiner

SEAT-MOUNTED WORK SURFACE

FIELD OF THE DISCLOSURE

The present disclosure generally relates to a work surface. More specifically, the present disclosure relates to a seat-mounted work surface.

BACKGROUND OF THE DISCLOSURE

Passenger compartments of vehicles are often provided with one or more seating assemblies. Alternative uses for the passenger compartment can be a factor in consumer purchasing decisions. While modern OEMs of passenger vehicles would currently warn against employing some alternative uses for the passenger compartment while the vehicle is in motion due to safety concerns, it is anticipated that technology and the regulatory framework may evolve in the future to where such an activity is safe and permissible.

SUMMARY OF THE DISCLOSURE

According to a first aspect of the present disclosure, a seating assembly includes a seatback coupled to a support surface. A seat is movably coupled to the seatback such that the seat is pivotable relative to the seatback. The seat is movable between a stowed position and a deployed position. A work surface is movably coupled to an underside of the seat. The work surface is movable between a stowed position and a deployed position.

Embodiments of the first aspect of the disclosure can include any one or a combination of the following features:
- the work surface is pivotably coupled to the underside of the seat;
- the stowed position of the seat places the seat in a generally vertical position;
- the work surface is movable to the deployed position when the seat is in the stowed position;
- the stowed position of the seat places a seating surface of the seat in an abutting relationship with a presented surface of the seatback;
- the stowed position of the work surface places the work surface in a generally parallel relationship with the seat;
- the deployed position of the work surface places the work surface in a non-parallel relationship with the seat;
- the non-parallel relationship is a perpendicular relationship;
- the work surface provides an abrasion resistant surface to the underside of the seat when the work surface is in the stowed position;
- the support surface is a wall of a vehicle;
- one or more components of the vehicle prevent the work surface from being transitioned to the deployed position when the seat is in the deployed position;
- the seatback is fixedly coupled to the support surface; and
- the work surface is retained in the stowed position by a latch assembly.

According to a second aspect of the present disclosure, a seating assembly includes a seatback, a seat, and a work surface. The seatback is fixedly coupled to a support surface. The seat is movably coupled to the seatback such that the seat is pivotable relative to the seatback. The seat is movable between a stowed position and a deployed position. The stowed position of the seat places the seat in a generally vertical position. The stowed position of the seat places a seating surface of the seat in an abutting relationship with a presented surface of the seatback. The work surface is movably coupled to an underside of the seat. The work surface is movable between a stowed position and a deployed position. The work surface is pivotably coupled to the underside of the seat. The work surface is movable to the deployed position when the seat is in the stowed position.

Embodiments of the second aspect of the present disclosure can include any one or a combination of the following features:
- the stowed position of the work surface places the work surface in a generally parallel relationship with the seat;
- the deployed position of the work surface places the work surface in a non-parallel relationship with the seat;
- the non-parallel relationship is a perpendicular relationship;
- the work surface provides an abrasion resistant surface to the underside of the seat when the work surface is in the stowed position;
- the support surface is a wall of a vehicle; and
- one or more components of the vehicle prevent the work surface from being transitioned to the deployed position when the seat is in the deployed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
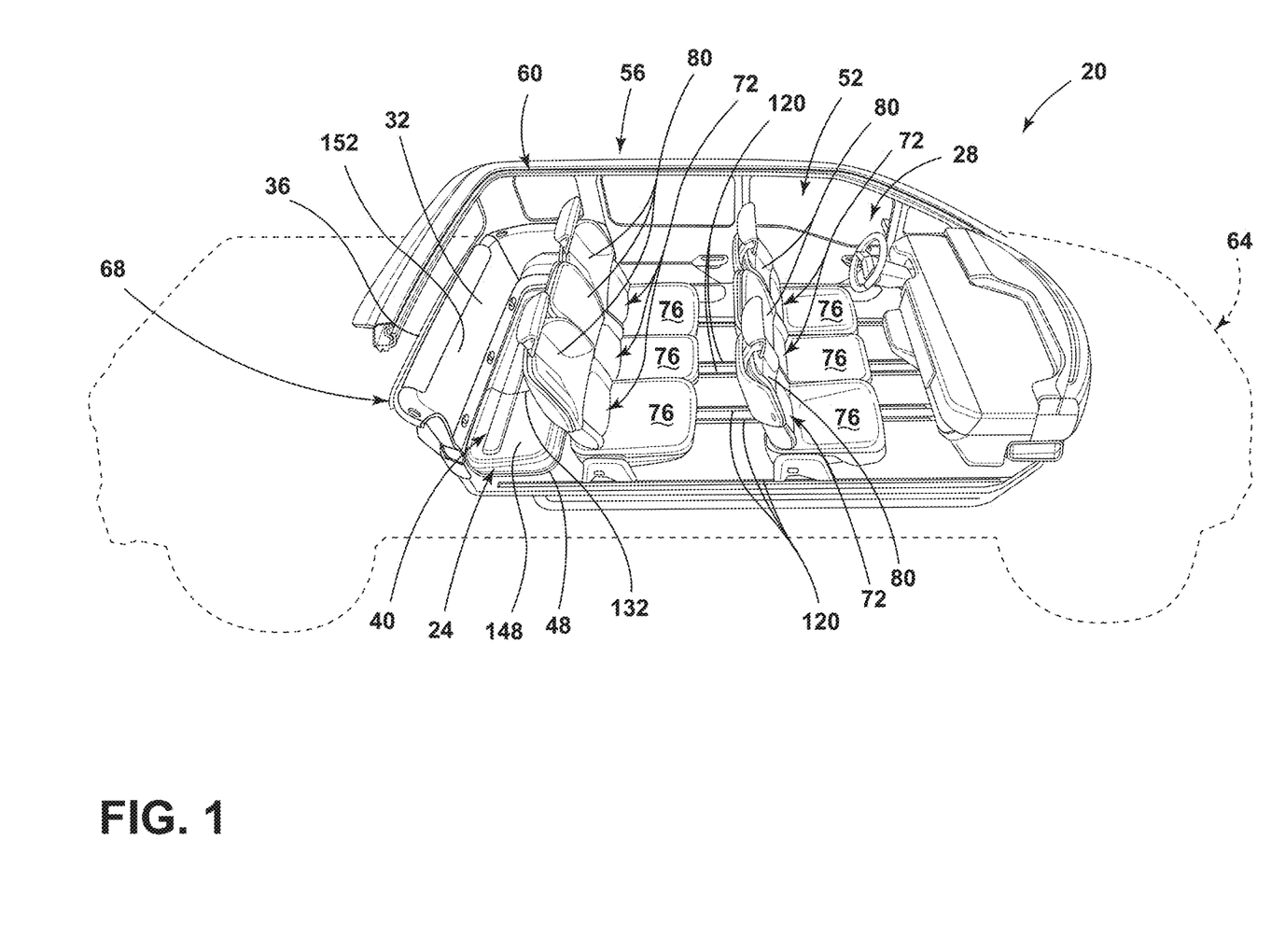
FIG. 1 is a side perspective view of a passenger compartment of a vehicle, illustrating various rows of seating assemblies, according to one arrangement.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seat-mounted work surface. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 20 generally designates a vehicle. The vehicle 20 may be a motor vehicle. While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting functions (e.g., accelerating, breaking, turning, signaling, etc.) independent of user interaction while the user maintains override control of the vehicle 20. A seating assembly 24 is provided within a passenger compartment 28 of the vehicle 20.

Figure 2:
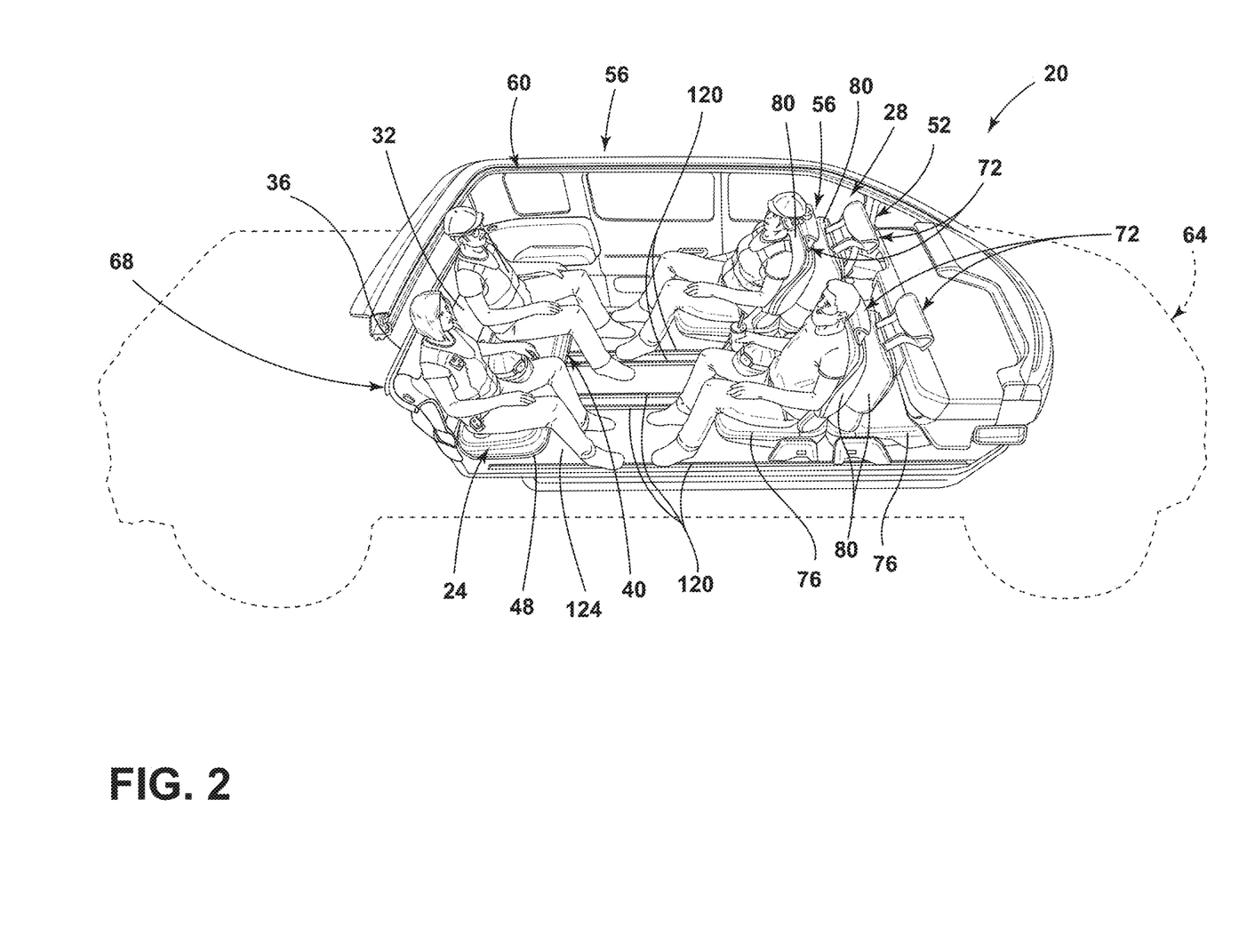
FIG. 2 is a side perspective view of the passenger compartment of the vehicle, illustrating the various rows of seating assemblies, according to an alternative arrangement when the vehicle is in a stationary non-moving state.
Figure 3:
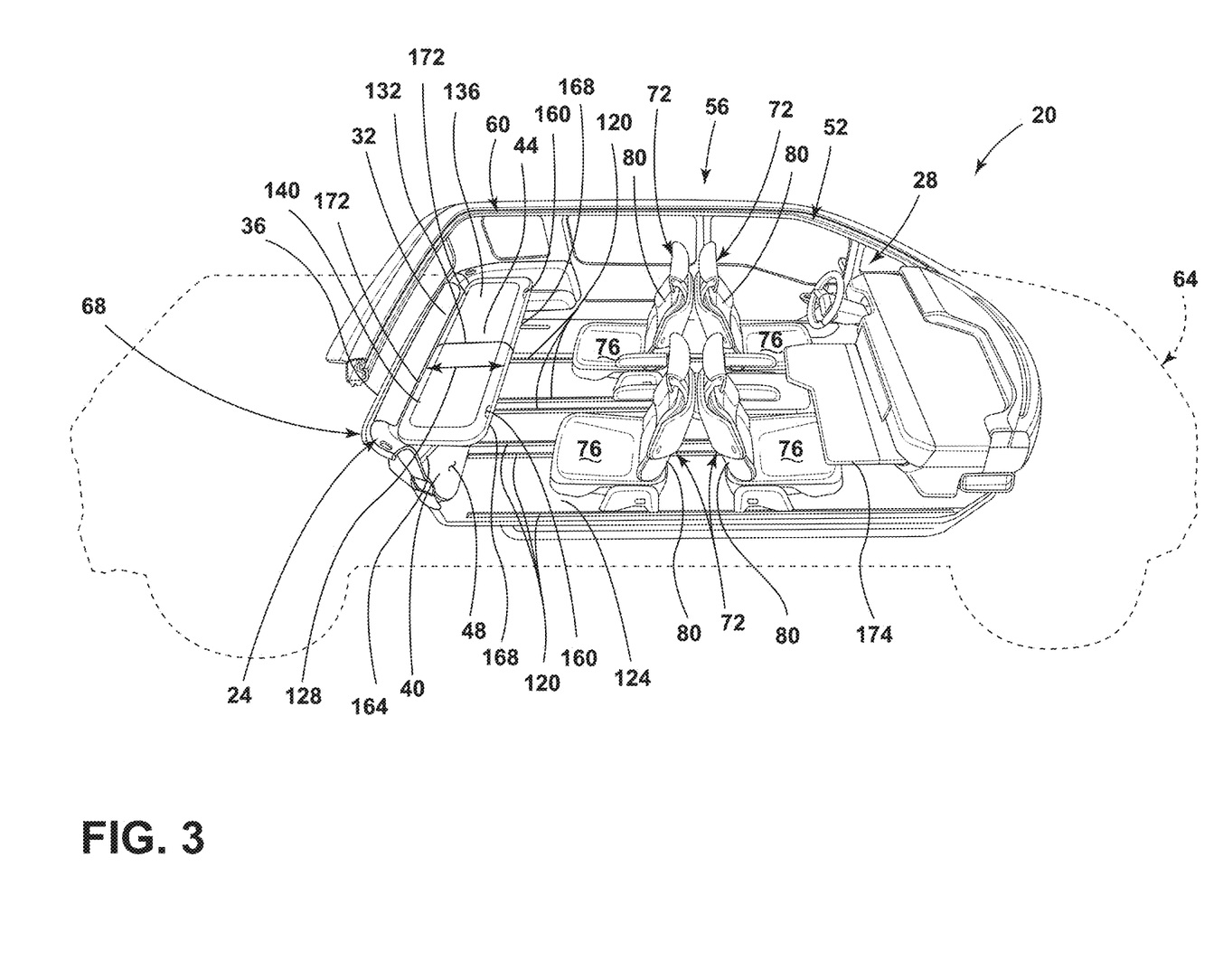
FIG. 3 is a side perspective view of the passenger compartment of the vehicle, illustrating a work surface in a deployed position, according to one arrangement when the vehicle is in the stationary non-moving state.
Figure 4:
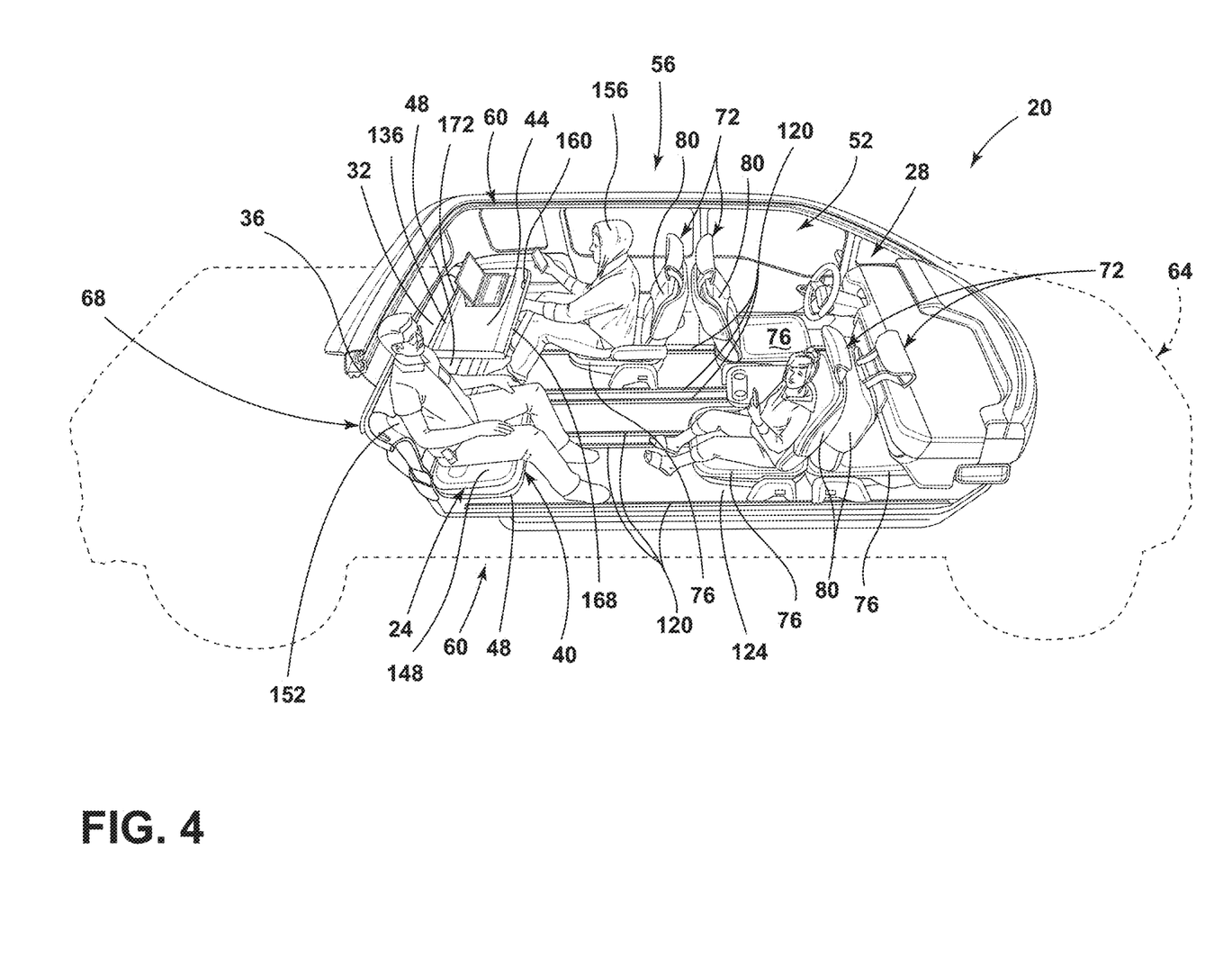
FIG. 4 is a side perspective view of the passenger compartment of the vehicle, illustrating the work surface in the deployed position, according to another arrangement when the vehicle is in the stationary non-moving state.
Figure 5:
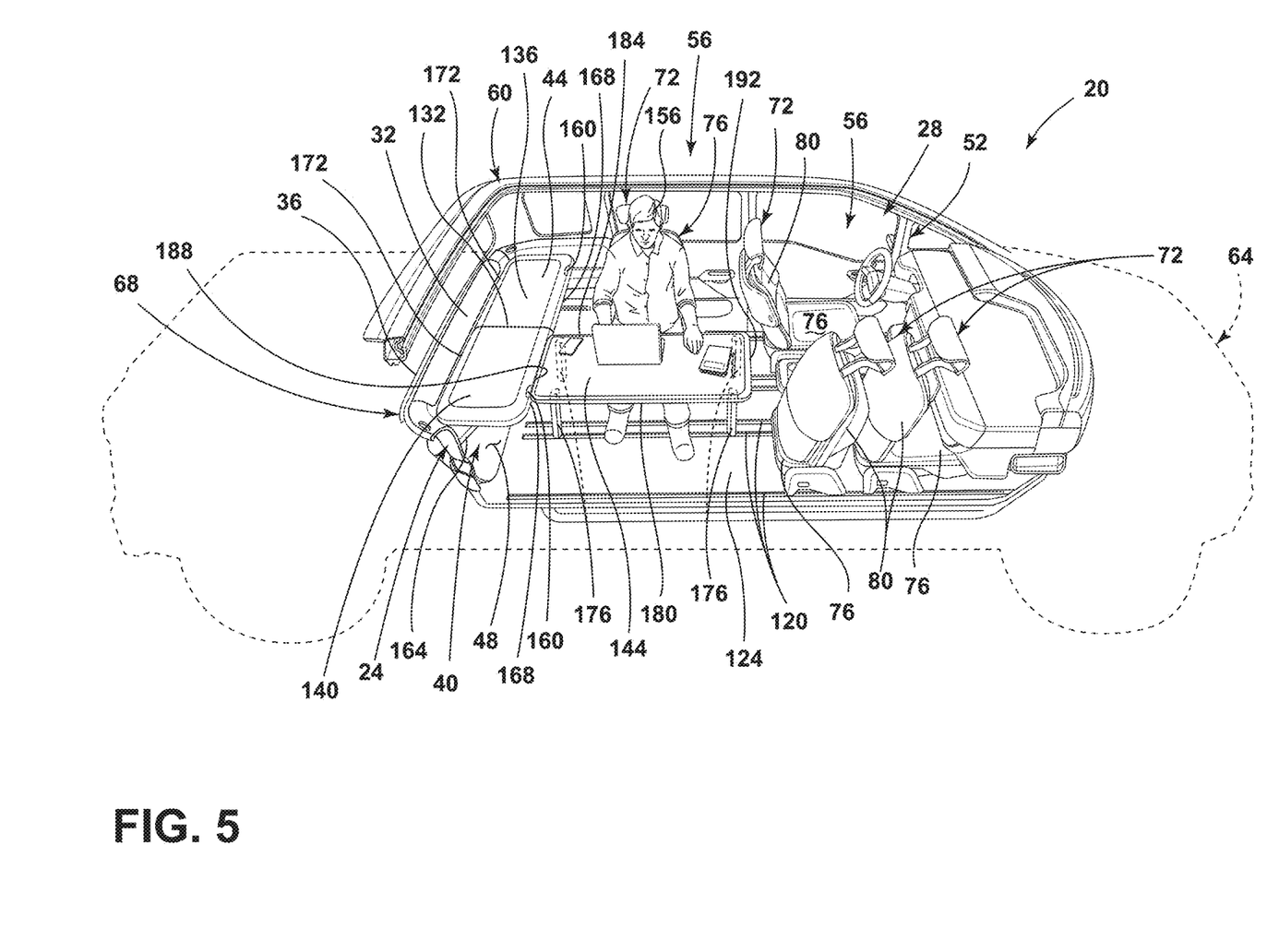
FIG. 5 is a side perspective view of the passenger compartment of the vehicle, illustrating a first work surface, a second work surface, and a third work surface in a deployed position, according to one example when the vehicle is in the stationary non-moving state.
Figure 6:
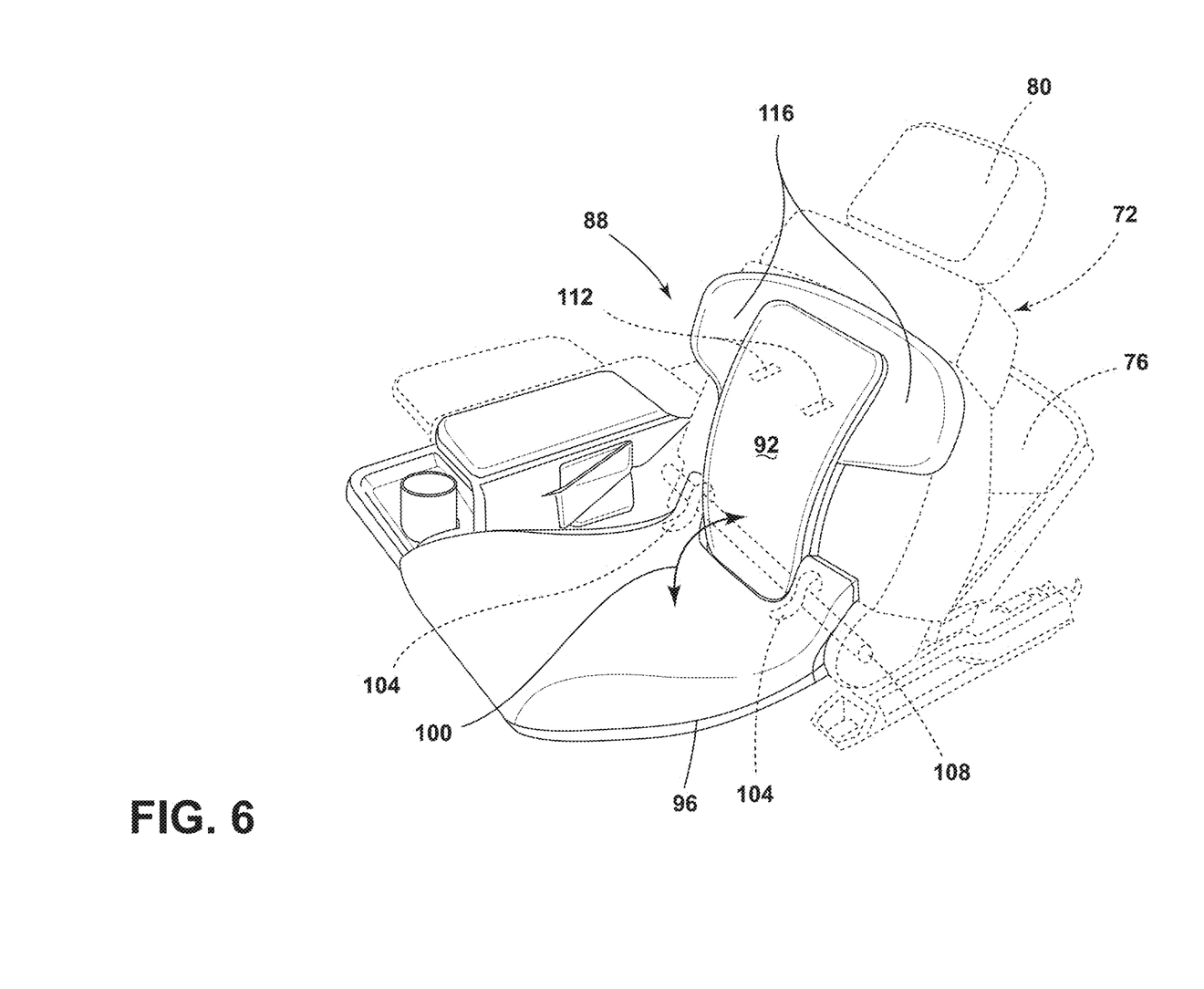
FIG. 6 is a rear perspective view of a seating assembly with an auxiliary seating assembly positioned on a rearward surface thereof, with the auxiliary seating assembly in a deployed position, according to one example.

Referring again to FIGS. 1-6, the seating assembly 24 includes a seatback 32 that is coupled to a support surface 36. In various examples, the seatback 32 may be fixedly coupled to the support surface 36. A seat 40 is movably coupled to the seatback 32 such that the seat 40 is pivotable relative to the seatback 32. The movable coupling of the seat 40 to the seatback 32 may be an indirect coupling. For example, the seat 40 may be movably coupled to the support surface 36. The seat 40 is movable between a stowed position (FIGS. 3 and 5) and a deployed position (FIGS. 1, 2, and 4). A work surface 44 is movably coupled to an underside 48 of the seat 40. The work surface 44 is movable between a stowed position (FIGS. 1 and 2) and a deployed position (FIGS. 3-5). The work surface 44 can provide a working area when the vehicle 20 is in a stationary non-moving state (e.g., while a transmission of the vehicle 20 is in park).

Referring further to FIGS. 1-6, the vehicle 20 can include a first row of seating assemblies 52, a second row of seating assemblies 56, and/or a third row of seating assemblies 60. The first row of seating assemblies 52 may be positioned nearest a front 64 of the vehicle 20 and/or the passenger compartment 28. The third row of seating assemblies 60 may be positioned nearest to a rear 68 of the vehicle 20 and/or the passenger compartment 24. The second row of seating assemblies 56 may be positioned at an intermediate location between the first and second rows of seating assemblies 52, 60. The first row of seating assemblies 52 and the second row of seating assemblies 56 can be provided with seating assemblies 72 that differ from the seating assemblies 24, as will be discussed in further detail herein. The seating assemblies 72 can each include a seat 76 and a seatback 80. The seat 76 and the seatback 80 of the seating assemblies 72 may be coupled to one another (e.g., by an intermediate structure) such that the seatback 80 is pivotable relative to the seat 76 and the seat 76 is pivotable relative to the seatback 80 (see FIG. 5). In some examples, the seating assemblies 72 may include a lower leg support. In such an example, the lower leg support may be rotatably coupled to a front end of the seat 76 such that the lower leg support is rotatable relative to the seat 76.

Referring still further to FIGS. 1-6, in various examples, one or more of the seating assemblies 72 may be provided with the ability to swivel or rotate about a vertical axis, where the vertical axis extends through the seat 76. Accordingly, such an example of the seating assembly 72 may be capable of being oriented in a forward-facing position and/or a rearward-facing position (see FIG. 4). In some examples, one or more of the seating assemblies 72 may be provided with an auxiliary seating assembly 88 for use while the vehicle 20 is in the stationary non-moving state. The auxiliary seating assembly 88 can be coupled to a rearward surface of the seatback 80 thereof. In such examples, an auxiliary seatback 92 may be carried by the rearward surface of the corresponding seatback 80. The auxiliary seatback 92 may be provided with a cushion portion that can enhance comfort of a user when seated in the auxiliary seating assembly 88. An auxiliary seat 96 can be coupled to the rear side of the seatback 80 and movable between a stowed position and a deployed position (e.g., see arrow 100). For example, the auxiliary seat 96 may be pivotably coupled to a lower region of the rear side of the seatback 80. In such an example, pivotable motion of the auxiliary seat 96 in an upward direction from the deployed position can accomplish the stowed position, whereby the auxiliary seat 96 is placed in an abutting relationship with the rear side of the seatback 80 and/or the auxiliary seatback 92.

Referring yet again to FIGS. 1-6, in some examples, the auxiliary seat 96 can include one or more seat engagement members 104 that are received by the seating assembly 72 for a removable coupling thereto. The seat engagement member(s) 104 may be configured such that they can be engaged with a bar 108 of the seating assembly 72. Similarly, the auxiliary seatback 92 can be provided with seatback engagement members 112 that enable a removable coupling with the rear side of the seatback 80. In various examples, the auxiliary seating assembly 88 can include auxiliary side bolsters 116 that are coupled to the seatback 80 of the seating assembly 72. The auxiliary side bolsters 116 may extend from an upper edge of the auxiliary seatback 92 downwardly along at least a portion of right and left sides of the auxiliary seatback 92. The seating assemblies 72 can each be coupled to a pair of track assemblies 120. The track assemblies 120 can each extend along a longitudinal direction of the passenger compartment 28. The track assemblies 120 may each have a length that is at least about 25% of a length of the passenger compartment 28. For example, the length of the track assemblies 120 may be at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, and/or combinations or ranges thereof of a longitudinal length of the passenger compartment 28. The seating assemblies 72 may be transitionable between the first row of seating assemblies 52 and/or the second row of seating assemblies 56 to accomplish the various arrangements of the passenger compartment 28 depicted herein.

Referring now to FIGS. 1-5, when the work surface 44 is in the stowed position, the work surface 44 can provide an abrasion resistant surface to the underside 48 of the seat 40. For example, the work surface 44 may be constructed from a polymeric material that can provide a degree of impact resistance and/or scratch resistance. The protection afforded to the underside 48 of the seat 40 by the work surface 44 being in the stowed position can be provided independent of the position of the seat 40. For example, when the seat 40 is in the deployed position and the work surface 44 is in the stowed position (FIG. 2), cargo items may be at least partially positioned below the seat 40 and the seat 40 may be protected from damage caused by such cargo items during maneuvering of the vehicle 20 (e.g., accelerating, decelerating, cornering, etc.). The coupling of the seat 40 to the support surface 36 of the vehicle 20 (e.g., a rear wall of the passenger compartment 28) may be accomplished in such a fashion that the seat 40 is suspended above a floor 124 of the passenger compartment 28 when the seat 40 is in the deployed position. Accordingly, the seating assembly 24 may be referred to as a stadium-style seating assembly or a theater-style seating assembly. The seating arrangements depicted in FIGS. 2-5 may be referred to as social arrangements, conferencing arrangements, and/or remote office arrangements. These social arrangements, conferencing arrangements, and/or remote office arrangements are intended for use when the vehicle 20 is in the stationary non-moving state (e.g., when the vehicle 20 is parked). While modern OEMs of passenger vehicles would currently warn against using one of the arrangements depicted in FIGS. 2-5 while the vehicle 20 is in motion due to safety concerns, it is anticipated that technology and the regulatory framework may evolve in the future to where such an activity is safe and permissible. In some examples, the vehicle 20 may be provided with functionality that prevents the vehicle 20 from transitioning out of the stationary non-moving state while the passenger compartment 28 is arranged in one of the arrangements depicted in FIGS. 2-5. For example, the vehicle 20 may be provided with the ability to prevent a transmission from shifting into a gear that facilitates motion of the vehicle 20 (e.g., drive or reverse) while the passenger compartment 28 is arranged as depicted in one of the arrangements depicted in FIGS. 2-5.

Referring again to FIGS. 1-5, one or more components of the vehicle 20 may prevent the work surface 44 from being transitioned to the deployed position when the seat 40 is in the deployed position. For example, a clearance between the underside 48 of the seat 40 and the floor 124 of the passenger compartment 28 may be less than a depth 128 of the work surface 44. Accordingly, intentional or unintentional deployment of the work surface 44 when the seat 40 is in the deployed position may be prevented by the work surface 44 contacting the floor 124 before the work surface 44 can reach the deployed position. In other words, the floor 124, or another component of the vehicle 20, can prevent the work surface 44 from reaching a fully-deployed position, but may permit the work surface 44 transitioning from the stowed position to a partially-deployed position. Therefore, in some examples, the work surface 44 may be movable to the deployed position only when the seat 40 is in the stowed position. However, the present disclosure is not so limited. Rather, it is contemplated that the work surface 44 may be movable to the deployed position (i.e., the fully-deployed position) when the seat 40 is in the deployed position such that the underside 48 of the seat 40, the work surface 44, the support surface 36, and/or the floor 124 of the passenger compartment 28 may at least partially define a cargo retention area that is positioned underneath the seat 40. Additionally, or alternatively, in examples where the work surface 44 is capable of deployment while the seat 40 is in the deployed position, the work surface 44 may provide a degree of support to the seat 40 by the work surface 44 engaging the floor 124. Said another way, the work surface 44 may act as legs for supporting the seat 40 when the seat 40 and the work surface 44 are each in the deployed position.

Referring to FIGS. 3-5, the seating assembly 24 may be a bench-style seating assembly that is divided into a first section and a second section along a dividing line 132. In such an example, the dividing line 132 may be carried on to the work surface 44 such that the work surface 44 is separated into a first work surface 136 and a second work surface 140. Accordingly, a surface area of the work surface 44 may be adjusted based on a particular desired use. In various examples, a third work surface 144 may be coupled to the track assemblies 120 in a removable fashion, as will be discussed in further detail herein. The work surface 44 can be pivotably coupled to the underside 48 of the seat 40. More specifically, the work surface 44 can be pivotably coupled to the underside 48 of the seat 40 proximate to a forward edge of the seat 40. A rotation axis of the work surface 44 may extend parallel to a lateral axis (e.g., a side-to-side axis) of the vehicle 20. The stowed position of the seat 40 may place the seat 40 in a generally vertical position (see FIG. 5). For example, the stowed position of the seat 40 may place a seating surface 148 of the seat 40 in an abutting relationship with a presented surface 152 of the seatback 32.

Referring again to FIGS. 3-5, the stowed position of the work surface 44 may place the work surface 44 in a generally parallel relationship with the seat 40. The generally parallel relationship between the seat 40 and the stored work surface 44 may be maintained independent of whether the seat 40 is in the stowed position or the deployed position. When the work surface 44 is transitioned to the deployed position, the work surface 44 may be placed in a non-parallel relationship with the seat 40. For example, the non-parallel relationship between the work surface 44 and the seat 40 may be a perpendicular relationship. More specifically, the seat 40 may assume a generally vertical position when the seat 40 is in the stowed position. Therefore, with the work surface 44 being arranged in a generally parallel relationship with the seat 40 when the work surface 44 is in the stowed position, the work surface 44 may assume a similar generally vertical position in the stowed position. However, when the seat 40 is in the stowed position and the work surface 44 is moved to the deployed position, the work surface 44 may assume a generally horizontal position for a user 156 to access.

Referring further to FIGS. 3-5, in various examples, the work surface 44 may be retained in the stowed position by one or more latch assemblies 160. In some examples, the one or more latch assemblies 160 may prevent access to the work surface 44 until the vehicle 20 is in the stationary non-moving state. When the user 156 desires to access the work surface 44, the latch assembly 160 may be disengaged, thereby permitting the user 156 to rotate the work surface 44 to the deployed position. Once in the deployed position, one or more support arms 164 may engage to provide a retention force for the work surface 44 to remain in the deployed position until such time as the user 156 elects to place the work surface 44 in the stowed position. In examples where the work surface 44 includes the first work surface 136 and the second work surface 140, one or more of the support arms 164 may be provided for each of the first work surface 136 and the second work surface 140. The support arm 164 may brace an underside of the work surface 44 at a location along the depth 128 of the work surface 44 that is positioned between a free end 168 of the work surface 44 and a coupled end 172 of the work surface 44.

Referring still further to FIGS. 3-5, in various examples, the one or more latch assemblies 160 may be push-button assemblies that are biased to a locked position. Transitioning the latch assembly 160 to an unlocked position may be accomplished by applying a compressive force to the latch assembly 160 (e.g., applying a compressive force toward the coupled end 172). It is contemplated that the latch assemblies 160 may additionally, or alternatively, be provided with functionality that enables disengagement of the one or more support arms 164 that results in permitting transition of the work surface 44 from the deployed position to the stowed position. For example, pulling on the latch assembly 160 in a direction that is away from the coupled end 172 may aid in releasing the one or more support arms 164 from the position associated with the deployed position of the work surface 44. In various examples, the passenger compartment 28 of the vehicle 20 may be provided with a deployable desk 174. The deployable desk 174 may be slidably coupled to a dashboard or an instrument panel of the vehicle 20.

With specific reference to FIG. 5, the third work surface 144 may be an accessory that is capable of removable coupling with the vehicle 20. For example, the third work surface 144 may be a manufacturer-offered add-on or an aftermarket accessory. When the third work surface 144 is in use within the passenger compartment 28, the vehicle 20 may be prevented from transitioning out of the stationary non-moving state. In various examples, the third work surface 144 may be stowable in a cargo area of the vehicle 20. In some examples, the third work surface 144 may be configured for coupling to an underside of the work surface 44. For example, the third work surface 144 may be configured with the same, or similar, dimensions as the first work surface 136. In such an example, the underside 48 of the seat 40 and/or an underside of the first work surface 136 may be configured to receive the third work surface 144 for stowage purposes. Accordingly, when the first work surface 136 is in the deployed position, the third work surface 144 may be removed from the underside 48 of the seat 40 and/or the underside of the first work surface 136 to ultimately place the third work surface 144 in a deployed position. The deployed positions of the first work surface 136, the second work surface 140, and the third work surface 144 are depicted in FIG. 5.

Referring again to FIG. 5, the third work surface 144 may be provided with one or more legs 176. It is contemplated that the third work surface 144 may be capable of use in environments that are exterior to the vehicle 20. In various examples, the legs 176 of the third work surface 144 may be deployably coupled to an underside of the third work surface 144. For example, the legs 176 of the third work surface 144 may be rotatably coupled and/or removably coupled to the underside of the third work surface 144 to facilitate a more compact stowing of the third work surface 144. The one or more legs 176 may be configured for engagement with one or more of the track assemblies 120. In some examples, the third work surface 144 may be provided with two of the legs 176 positioned along a first side 180 of the third work surface 144. In various examples, the third work surface 144 may be provided with four of the legs 176, with two of the legs 176 being positioned along the first side 180 of the third work surface 144 and two of the legs 176 being positioned along a second side 184 of the third work surface 144. In some examples, the third work surface 144 may engage with the free end 168 of the work surface 44 (e.g., the first work surface 136 or the second work surface 140) in a manner that provides a degree of support to a proximate end 188 of the third work surface 144. For example, the underside of the work surface 44 and/or the underside of the third work surface 144 may be provided with one or more fastener assemblies capable of extending therebetween such that the free end 168 and the proximate end 188 may be held in a generally abutting relationship by engagement of the one or more fastener assemblies.

Referring further to FIG. 5, in examples where the free end 168 and the proximate end 188 are capable of direct coupling with one another, the legs 176 may be provided at a distal end 192 of the third work surface 144. In such an example, the one or more support arms 164 of the work surface 44 can provide support to the proximate end 188 of the third work surface 144 such that the proximate end 188 and the free end 168 are both suspended above the floor 124 of the passenger compartment 28, thereby providing more continuous leg room for the user 156 than if one or more of the legs 176 were used in place of the one or more fastener assemblies. As used herein, the proximate end 188 and the distal end 192 may be in reference to relative positioning with regard to the work surface 44. Said another way, the proximate end 188 of the third work surface 144 may be the end of the third work surface 144 that is nearest to the work surface 44 and the distal end 192 may be the end of the third work surface 144 that is furthest from the work surface 44.

The functionality provided in the passenger compartment 28 of the present disclosure enables a variety of alternative uses for the passenger compartment 28 of the vehicle 20. In addition to providing a variety of seating arrangements within the passenger compartment 28, the present disclosure provides the vehicle 20 with a passenger compartment 28 that can be employed as a mobile office, a mobile meeting room, a mobile breakroom, and so on. While modern OEMs of passenger vehicles would currently warn against using the work surface 44 (e.g., the first work surface 136, the second work surface 140, and/or the third work surface 144) while the vehicle 20 is in motion due to safety concerns, it is anticipated that technology and the regulatory framework may evolve in the future to where such an activity is safe and permissible.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly, comprising:
a seatback coupled to a support surface;
a seat movably coupled to the seatback such that the seat is pivotable relative to the seatback, wherein the seat is movable between a stowed position and a deployed position, wherein the stowed position of the seat places the seat in a generally vertical position; and
a work surface pivotably coupled to an underside of the seat, wherein the work surface is movable between a stowed position in which the work surface is in a generally parallel relationship with the stowed position of the seat and a deployed position in which the work surface is in a non-parallel relationship with the seat, wherein the work surface is movable to the deployed position when the seat is in the stowed position.

2. The seating assembly of claim 1, wherein the stowed position of the seat places a seating surface of the seat in an abutting relationship with a presented surface of the seatback.

3. The seating assembly of claim 1, wherein the non-parallel relationship is a perpendicular relationship.

4. The seating assembly of claim 1, wherein the work surface provides an abrasion resistant surface to the underside of the seat when the work surface is in the stowed position.

5. The seating assembly of claim 1, wherein the support surface is a wall of a vehicle.

6. The seating assembly of claim 5, wherein one or more components of the vehicle prevent the work surface from being transitioned to the deployed position when the seat is in the deployed position.

7. The seating assembly of claim 1, wherein the seatback is fixedly coupled to the support surface.

8. The seating assembly of claim 1, wherein the work surface is retained in the stowed position by a latch assembly.

9. A seating assembly, comprising:
- a seatback fixedly coupled to a support surface;
- a seat movably coupled to the seatback such that the seat is pivotable relative to the seatback, wherein the seat is movable between a stowed position and a deployed position, wherein the stowed position of the seat places the seat in a generally vertical position, and wherein the stowed position of the seat places a seating surface of the seat in an abutting relationship with a presented surface of the seatback; and
- a work surface movably coupled to an underside of the seat, wherein the work surface is movable between a stowed position in which the work surface is in a generally parallel relationship with the stowed position of the seat and a deployed position in which the work surface is in a non-parallel relationship with the seat, wherein the work surface is pivotably coupled to the underside of the seat, and wherein the work surface is movable to the deployed position when the seat is in the stowed position.

10. The seating assembly of claim 9, wherein the non-parallel relationship is a perpendicular relationship.

11. The seating assembly of claim 9, wherein the work surface provides an abrasion resistant surface to the underside of the seat when the work surface is in the stowed position.

12. The seating assembly of claim 9, wherein the support surface is a wall of a vehicle.

13. The seating assembly of claim 12, wherein one or more components of the vehicle prevent the work surface from being transitioned to the deployed position when the seat is in the deployed position.

* * * * *